April 26, 1927.

P. J. DUFFY

PLIERS

Filed March 30, 1926

Inventor
Patrick J. Duffy

By

Attorney

Patented Apr. 26, 1927.

1,626,274

UNITED STATES PATENT OFFICE.

PATRICK JOSEPH DUFFY, OF HOLYOKE, MASSACHUSETTS.

PLIERS.

Application filed March 30, 1926. Serial No. 98,582.

The present invention relates to pliers that are particularly adapted for cutting armored cable, though obviously not limited to this special use.

The object is to provide a simple tool which will effectively cut the armored strip and is readily applicable to cables of different diameters.

Figure 1:
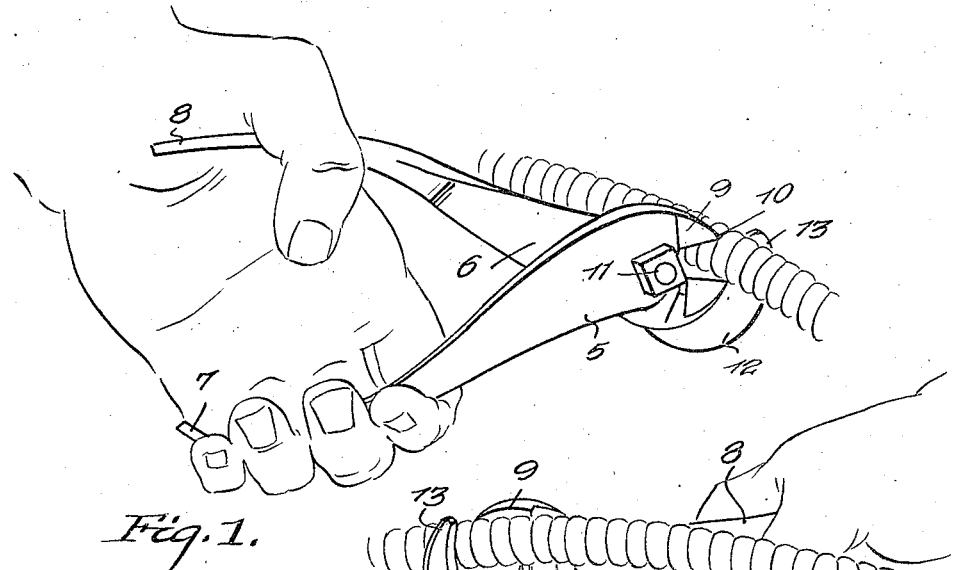
Figure 1 is a perspective view of the tool showing the same in cutting relation.
Figure 2:
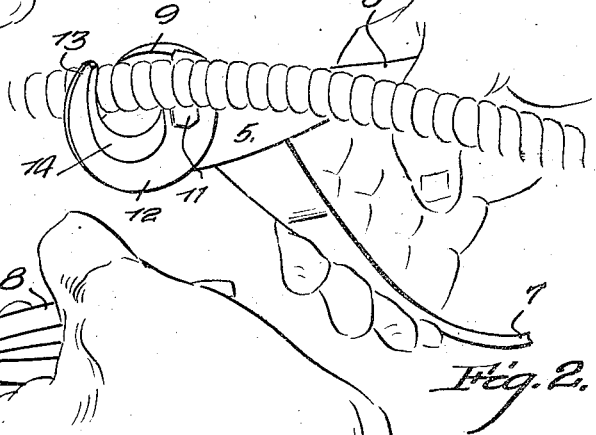
Figure 2 is a similar view, but from a different viewpoint.
Figure 3:
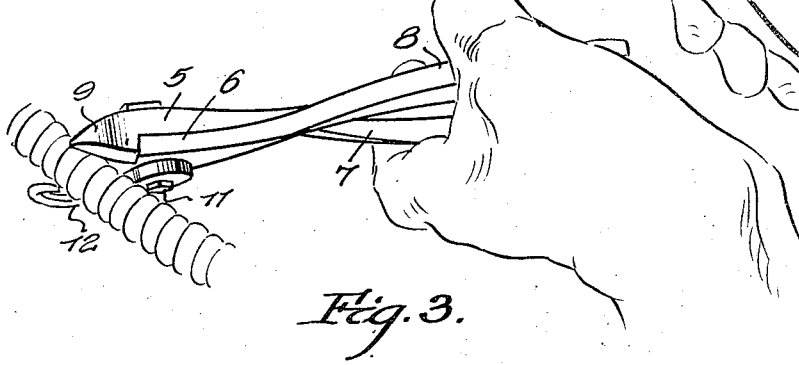
Figure 3 is a top perspective view.
Figure 4:
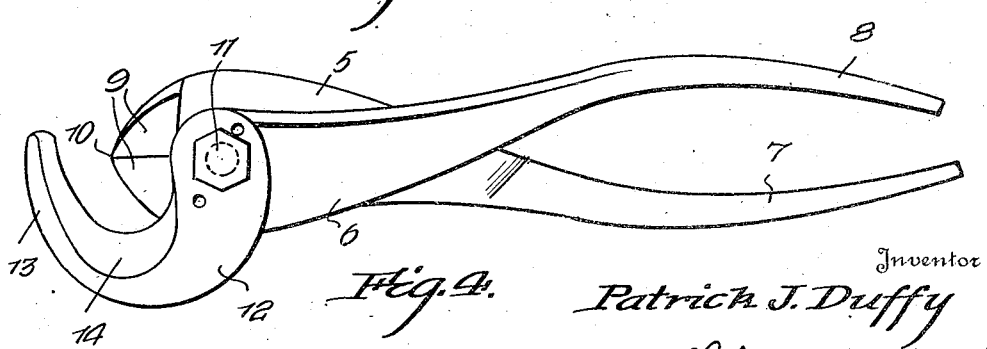
Figure 4 is a side elevation of the tool.

In the embodiment disclosed a pair of levers 5 and 6 are formed at one end, with handle grips 7 and 8, their other ends being formed into short cutting jaws 9, the free ends of which 10 are pointed. These levers are crossed and are connected by a pivot 11.

Mounted at one end of the pivot alongside one of the jaws is a hook 12 that is journaled on the pivot, so that it may be turned to different positions. This hook has a long bill 13 that extends transversely to and beyond the ends of the jaws 9. It is preferably beveled along its inner side, as indicated at 14.

With a tool as thus constructed, when it is desired to cut the armor of a cable, the hook 13 is engaged around the same, so that the points of the jaws will embrace the armored strand in a direction to move transversely therof. Consequently when the handles are moved together, the points will cut across the strand and will be held to their cutting path of movement by the hook. Having cut across the strand, the sections may be easily separated.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim, is—

1. A plier for cutting armored cable and the like, comprising pivotally connected handles having cutting jaws, and a cable holding hook carried thereby and extending beyond the cutting jaws.

2. A plier for cutting armored cable and the like, comprising pivotally connected handles having cutting jaws, and a cable holding hook mounted alongside one of the jaws and having an offset bill that extends transversely to and beyond the free end of the jaws.

3. A plier for cutting armored cable and the like comprising handles having cutting jaws, a pivot connecting the handles, and a cable holding hook journaled on the pivot alongside one of the jaws and having an offset bill that extends transversely to and beyond the free end of the jaws.

In testimony wherof, I affix my signature.

PATRICK JOSEPH DUFFY.